UNITED STATES PATENT OFFICE.

GEORG FRERICHS, OF BONN, GERMANY.

TOMATO PRESERVES AND PROCESS OF MAKING THE SAME.

1,119,263.     Specification of Letters Patent.     Patented Dec. 1, 1914.

No Drawing.     Application filed March 19, 1914. Serial No. 825,810.

*To all whom it may concern:*

Be it known that I, GEORG FRERICHS, a citizen of the German Empire, and residing at Bonn, Germany, have invented a certain new and useful Improved Tomato Preserve and Process of Making the Same, of which the following is a specification.

My invention relates to the manufacture of tomato preserves.

Tomato preserves were made heretofore by concentrating the tomato pulp, liberated from the skin and seeds, by inspissation and then sterilizing it in closed cans or in other manner. Also, processes of making tomato preserves in a dry form are already known. The preserves thus obtained contain, of course, sugar which is contained in the tomato juice.

A primary object of my invention is to provide tomato preserves containing a relatively high percentage of palatable substances and of very agreeable taste by removing the sugar, of which the juice contains up to about 2 to 2.5 per cent. in a suitable manner. It would seem obvious to remove the sugar by fermentation with yeast, but this is not always feasible. If the pulp of the tomatoes is left to ferment after yeast has been added to it the sugar is removed; the red color of the pulp suffers, however, the pulp becomes discolored, and, in addition, cannot be separated from the yeast that is greatly increased during the fermentation. Consequently, the pulp thus treated has a strong taste of yeast which does not disappear during inspissation. By proceeding in the manner described hereinafter a tomato preserve is obtained whose color has not suffered, and which is not impurified with yeast.

According to my invention the tomatoes preferably cooked to a pulp are driven in known manner through a sieve in order to separate the skin and seeds. The tomato pulp thus obtained is then separated, in the manner customary when manufacturing preserves from plants or vegetables, by pressure or centrifuging with subsequent washing with water into the solid and liquid portions; the juice is mixed with yeast, liberated from the yeast by filtering or centrifuging after the termination of the fermentation and then reunited with the solid portion of the pulp, which has been preserved sterile in the meantime, as in well known similar processes. If desired, the fermented juice may be united in a continuous operation with a corresponding quantity of the solid portion from another quantity of tomatoes. The tomato pulp now free from sugar may be evaporated to any desired thickness or to dryness. The concentration may be effected by inspissating the fermented juice by itself and uniting with the inspissated juice the solid portion of the pulp which has likewise been liberated as much as possible from the water by evaporation or by severe pressure.

I claim:—

1. A process of manufacturing tomato preserve consisting in separating tomato pulp liberated from skin and seeds into its solid constituents and juice, in removing the sugar from the juice, and in then reuniting the juice liberated from sugar with the solid constituents.

2. A process of manufacturing tomato preserve consisting in separating tomato pulp liberated from skin and seeds into its solid constituents and juice, in removing the sugar from the juice by fermentation with yeast, and in then reuniting the juice liberated from sugar with the solid constituents.

3. A process of manufacturing tomato preserve consisting in separating tomato pulp liberated from skin and seeds into its solid constituents and juice by pressure and subsequent washing with water, in removing the sugar from the juice by fermentation with yeast, in inspissating the treated juice, and in then mixing the same with the solid constituents.

4. Tomato preserve composed of the solid constituents of tomato pulp liberated from skin and seeds and mixed with tomato juice from which the sugar has been removed.

In testimony whereof, I affix my signature in the presence of two witnesses.

GEORG FRERICHS.

Witnesses:
    CARL MIGEN,
    LOUIS VANDORY.